United States Patent
Daigle et al.

(10) Patent No.: US 7,881,215 B1
(45) Date of Patent: Feb. 1, 2011

(54) STATEFUL AND STATELESS DATA PROCESSING

(75) Inventors: Russell L. Daigle, San Jose, CA (US);
Reinaldo Penno, Nashua, NH (US);
Chang Tony Zhang, Winchester, MA (US); Thomas Bastian, Heidelberg (DE); Ying Liu, Wilmington, MA (US);
Christopher Payson, Bradford, NH (US); Donald Emond, Boxboro, MA (US)

(73) Assignee: Avaya Inc., Basking Ridge, NJ (US)

( * ) Notice: Subject to any disclaimer, the term of this patent is extended or adjusted under 35 U.S.C. 154(b) by 1081 days.

(21) Appl. No.: 10/955,890

(22) Filed: Sep. 30, 2004

Related U.S. Application Data

(60) Provisional application No. 60/554,279, filed on Mar. 18, 2004.

(51) Int. Cl.
*H04L 12/26* (2006.01)
(52) U.S. Cl. .......................... 370/252; 709/224
(58) Field of Classification Search ........... 370/389, 370/392, 473–476, 252–253; 709/220, 223, 709/224
See application file for complete search history.

(56) References Cited

U.S. PATENT DOCUMENTS

| | | | | |
|---|---|---|---|---|
| 6,115,394 A * | 9/2000 | Balachandran et al. | ...... | 370/477 |
| 6,493,752 B1 * | 12/2002 | Lee et al. | ...... | 709/223 |
| 6,791,947 B2 * | 9/2004 | Oskouy et al. | ...... | 370/474 |
| 7,042,877 B2 * | 5/2006 | Foster et al. | ...... | 370/469 |
| 7,139,242 B2 * | 11/2006 | Bays | ...... | 370/392 |
| 2002/0009079 A1 * | 1/2002 | Jungck et al. | ...... | 370/389 |
| 2003/0088664 A1 * | 5/2003 | Hannel et al. | ...... | 709/224 |
| 2004/0151148 A1 * | 8/2004 | Yahagi | ...... | 370/338 |
| 2005/0152322 A1 * | 7/2005 | Dolwin et al. | ...... | 370/338 |

\* cited by examiner

*Primary Examiner*—Ricky Ngo
*Assistant Examiner*—Pao Sinkantarakorn
(74) *Attorney, Agent, or Firm*—Withrow & Terranova, PLLC

(57) ABSTRACT

The present invention provides systems and methods enabling network nodes to process data in a more efficient manner. In one aspect, the present invention analyzes data processed in a network node and determines whether the data requires processing in a stateful mode. If the data does not require processing in a stateful mode, the present invention processes the data in a stateless mode thereby saving processing resources. Embodiments of the present invention permit selection of processing modes in both manual and dynamic manners. Further, the determination of whether to process data in a stateful or a stateless mode may be made in response to various stimuli.

21 Claims, 4 Drawing Sheets

STATEFUL AND STATELESS DATA PROCESSING

CROSS-REFERENCE TO RELATED APPLICATION

This application claims priority from commonly assigned, provisional patent application Ser. No. 60/554,279, entitled "Stateful and Stateless Data Processing," filed Mar. 18, 2004, which is incorporated herein by reference.

FIELD OF THE INVENTION

The present invention relates to network data processing, and in particular to providing devices and methods enabling network processing elements to switch between processing data in a stateful and stateless mode.

BACKGROUND OF THE INVENTION

Data networks are fundamentally a collection of data processing points, or network nodes, that are interconnected by communications paths between the nodes. There are many different types of networks and network data processing schemes. A given network may be characterized, for example, by the type of data transmission technology in use on it (for example, a Transmission Control Protocol/Internet Protocol (TCP/IP) or Systems Network Architecture network); by whether it carries voice, data, or both kinds of signals; by who can use the network (public or private); by the usual nature of its connections (dial-up or switched, dedicated or non-switched, or virtual connections); and by the types of physical links (for example, optical fiber, coaxial cable, twisted pair, etc.).

In many types of networks, data is passed along the communications paths in the form of packets. A packet is the unit of data that is routed between an origin and a destination on any other packet-switched network such as, for example, the Internet. When any file (e.g., e-mail message, hypertext markup language (HTML) file, Graphics Interchange Format (GIF) file, Uniform Resource Locator (URL) request, etc.) is sent from one place to another on a network, the Transmission Control Protocol (TCP) layer of the TCP/IP protocol divides the file into chunks of an efficient size for routing. Each of these packets is separately numbered and includes the Internet address of the destination so that the network nodes can efficiently keep track of, and route, the packets. The individual packets for a given file may travel different routes through the Internet. When they have all arrived, they are reassembled into the original file by the TCP layer at the receiving end.

Data traveling through a network may have various properties, or be characterized in a number of different ways. Data, for example, may be classified by "data flow" (i.e., a collection of related packets with similar packet properties) or "data conversation" (i.e., bi-directional packet flow). Furthermore, data may be characterized by whether it is moving in a "macro-flow" or a "micro-flow." A micro-flow is a unidirectional signal content flow, whereas a macro-flow is made up of more than one unidirectional micro-flow. Division of macro- and micro-flows allows a hierarchical control and management of content flows. This hierarchical structure of traffic conditioners provides scalability to the collaborative streaming system architecture. In micro-flow traffic conditioners, data packets may be parsed at the object data packet level, thus enabling packet buffering, scheduling, and dropping to be carried out based on the object descriptor in the packet.

Packets traveling through packet networks may have also have associated "state" information. In general, the term "state" refers to the current or last-known status or condition of a process, transaction or setting. Therefore, "stateless" refers to data processing that does not keep track of configuration settings, transaction information or any other historical information about the processed data packets. When a processing program is stateless (i.e., it does not maintain state), or when the infrastructure of a system prevents a program from maintaining state, it cannot take information about the last session or packet into the next, such as settings the user made or conditions that arose during prior processing.

Stateless services do not maintain any "state" on a data flow or a data conversation basis and, therefore, do not correlate associated micro-flows together. Therefore, a processor will not know that two micro-flows of a TCP connection are associated, and similarly, for example, for data associated with an FTP program, control and data channels will not be correlated.

In contrast, stateful processing takes into account many conditions of the data, including historical packet activity. For example, some forms of network security applications require stateful processing. Such applications may require the monitoring, of conversations in the packet stream that comprise requests and responses to requests. Stateful processing permits the processor to keep track of the requests and responses by maintaining data about the history of packets.

Furthermore, stateful processing can correlate different bi-directional flows of multi-channel applications into a single, related conversation. For example, stateful processing can correlate bi-directional flows of the different 5-tuple bi-directional flows of FTP control and data into a single, related conversation since the Open Systems Integration (OSI) Model Layer 7 application data in the control channel packets explicitly refer to the 5-tuple of the data session flows.

In addition, state can be maintained across and outside of flow and conversations boundaries, for instances where Layer 7 data contained within packets is used to associate otherwise apparently unrelated flows or conversations. For example, state can be maintained in Hypertext Transfer Protocol (HTTP)/Secure Socket Layer (SSL) shopping card transaction transactions where 5-tuple conversations must be associated. State can also be maintained in SIP end-point communications that use different 5-tuple flows over time to refer to the same conversation by use of non-5-tuple conversation identification fields within the SIP application data.

Many network nodes process "packet flow" or "data flow" using a stateful processing method. Depending on the state of packets within a flow, rather than fully processing each packet, a node may fully process only a sampling of packets and determine how those packets should be handled. The node processor may them process similar packets (as determined by the packet's header information) in the data flow in the same manner without fully examining each packet.

Another use of statefully tracking flows and conversations is to be able to provide additional service to the application flows by understanding what the application packet flow is trying to perform by understanding and remembering the Layer 7 data contained within the packets; for example, intelligent security services, Quality of Service ("QoS") and other functions can be applied to such data when the intent of the application is understood. Unfortunately, nodes that host large numbers of traffic flows have the potential to of significantly degraded service due to the demands of processing the data flows in this stateful manner.

There is a need, therefore, to determine when data may be processed statelessly, thereby saving system resources, and when data must be processed in a stateful manner due to the requirements of the processors and applications using the data (e.g., Firewalls, NAT, QoS, load-balancing applications, etc.) and the requirements of the data flow itself. There is a further need to provide implementation and management of stateful and stateless data processing. In addition, there is an identified need to manage stateful and stateless data processing at various levels of data processing. There is a further need to provide both manual and dynamic control of stateful and stateless data processing in order to provide greater control, and therefore greater efficiency, in data processing throughout data networks.

SUMMARY OF THE INVENTION

The present invention provides systems and methods for switching the processing of data in a network node between a stateful and a stateless mode, thereby providing an optimized forwarding path and mechanism for network data traffic that does not require stateful inspection. The present invention allows the processing node to process data in either a stateful or a stateless mode depending on a set of manual configurations and dynamic criteria. The present invention therefore provides an optimized forwarding path mechanism which allows efficient processing in high data traffic and high data volume environments without the use of excessive processing resources (e.g., memory, processor, etc.) on the node processing platform. The present invention also supports larger number of stateful flows and conversations on a given device by handling some subset of the packets and/or flows statelessly.

According to one aspect of the present invention, a method and system is provided for processing data in a data network node. According to the invention, a data packet which includes state information is received in the network node and the data packet is analyzed. As a result of the packet analysis, the invention determines whether the data packet may be processed without maintaining state information. If the data packet may be processed without maintaining state information, the invention discards the packet's state information.

According to other aspects of the invention, various parts of the packet, such as the packet header or payload are analyzed to determine whether the packet's state information may be discarded. The program information may then be used to determine whether to discard state information. In other aspects, the information and characteristics of the packet are compared to a policy set to determine whether to discard state information.

According to another aspect of the present invention, the packet is analyzed by reading information contained in the data packet. The present invention then assigns packet characteristics to the data packet. According to another aspect, the invention determines a program type with which the analyzed data packet is associated based upon payload information from the packet.

According to another aspect, the present invention dynamically determines whether to process packet data statefully in response to stimuli such as network conditions, level of resource consumption, incoming or outgoing interface of packet, time and date, or any combination of the above. According to another aspect, such stimuli may work with other policy set parameters and alter the policy set to account for such dynamic changes.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Figure 1:
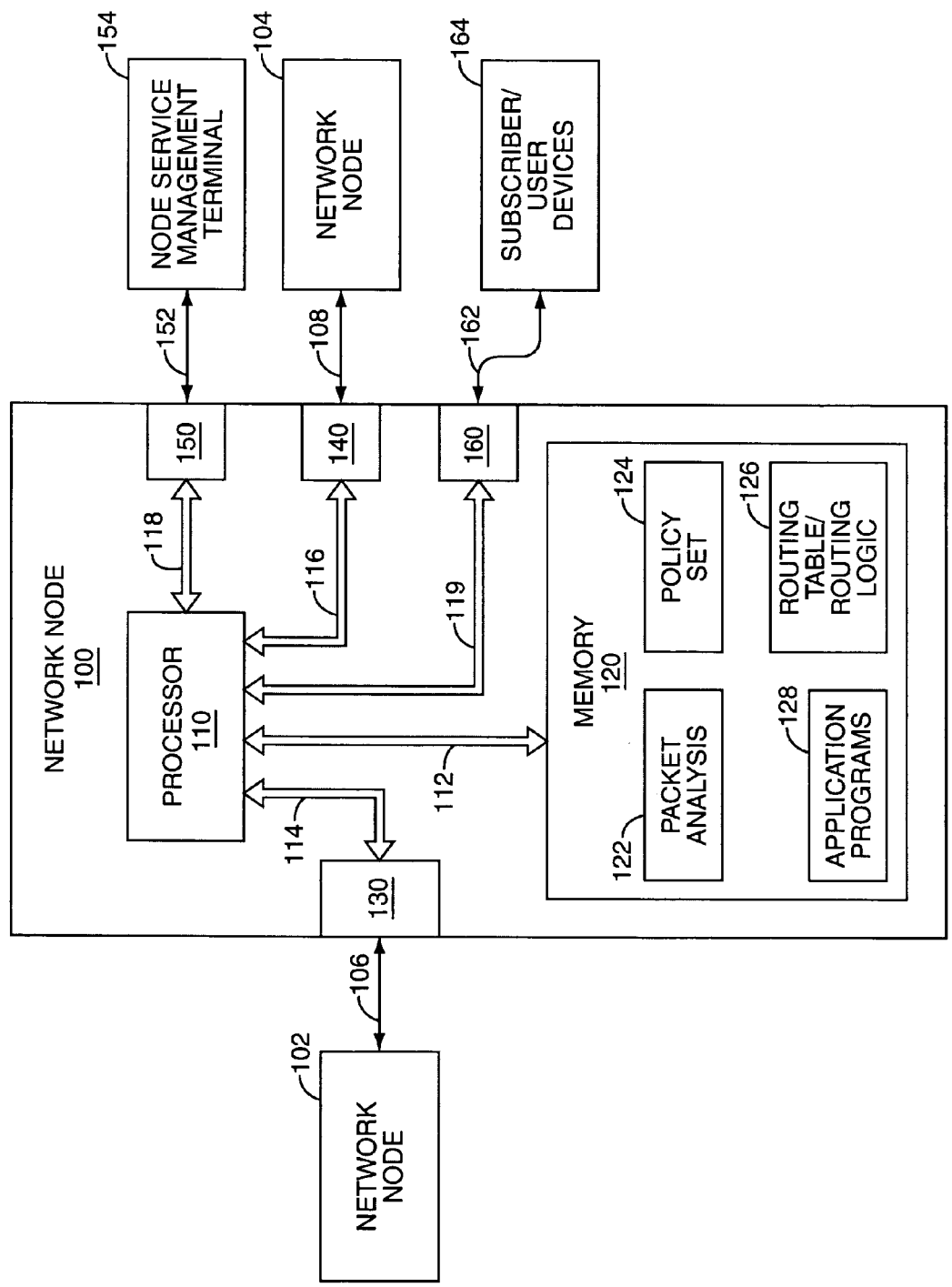
FIG. 1 illustrates a network environment including aspects of embodiments of the present invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides an optimized forwarding path and mechanism for network data traffic that does not require stateful inspection and allows the processing node to process data in either a stateful or a stateless mode depending on a set of manual configurations, dynamic criteria, or both. The present invention therefore provides an optimized forwarding path mechanism which is particularly useful in processing data in high data traffic and high data volume environments without the use of excessive processing resources (e.g., memory, processor, etc.) on the node processing platform.

The present invention supports a service level where stateful processing is not a base requirement of data processing for various types of data and data services. This allows service providers to scale such services better on a network node. For example, services such as basic residential Digital Subscriber Line (DSL) service typically do not require stateful processing. A service provider using the present invention may choose, therefore, not to provide stateful processing to specific connection, e.g., DSL connections, in order to save processing resources.

The present invention seeks to optimize performance by processing data in a stateless manner whenever possible, but does not bypass any stateful services when stateful services are required. However, when stateful services are not in use or are not required, for example, for certain micro-flows, the present invention provides an optimized forwarding path which scales with traffic and flows generated by the end-user.

For purposes of this specification, the term service provider is used to describe any entity that is responsible for operating a network node regardless of whether the service provider actually provides services to an end-user of a network. Entities that operate nodes on the Internet backbone will, for example, be referred to as service providers. Furthermore, the terms "subscriber" "and end-user" are used to refer to any logical access network connection (e.g., a residential DSL subscriber).

The present invention also provides the flexibility to activate either stateful and/or non-state aware services for any given combination of services or end-users provided by the network node. This permits applications that do not need stateful services to conserve processing resources thereby allowing more scalability for stateful services. Hence overall performance and scalability of the platform is increased when the invention is in use.

According to the present invention, the processing level at which data processing may be controlled is called a "domain." Examples of domains include, but are not limited to, a network subscriber (e.g., a residential or business subscriber that is recognized as an individual entity), a virtual private network (VPN), a virtual router context, any logical or physical interface, packet flows, or a superset or aggregation of any combination of the above domain types. In addition, all domains in a physical product may be considered a single domain. Not all processing within a domain must be handled statefully or statelessly. Rather, processing may occur statelessly for some applications and statefully for other applications.

An embodiment of the present invention is illustrated in FIG. 1. Referring to FIG. 1, a series of network nodes 100, 102, and 104 are connected by communications links 106 and 108, respectively. As used in this specification, a network node is a generic term that may be used to describe any point in a data network that receives and processes data packets. Examples of network nodes include signaling points (e.g., signal transfer points, signal control points, signal switching points, etc.), mobile switches, base station controllers, serving GRPS support nodes, packet data support nodes, gateway GPRS support nodes, radio node controllers, wireless data gateways, data network routers, network access nodes, service nodes, etc.

Representative network node 100 includes a processor 110 and memory 120 to implement data handling functions. The processor 110 is connected to the memory 120 via data bus 112.

The processor 110 is also connected via data buses 114 and 116 to data exchange interfaces 130 and 140. The data exchange interfaces 130, 140 are, in turn, connected to communication links 106 and 108, respectively, allowing communications with network nodes 102 and 104.

Network node 100 is also connected to a node service management terminal 154. Specifically, the processor 110 of network node 100 is connected to a data exchange interface 150 through data bus 118. The data exchange interface 150 is, in turn, connected to the node service management terminal 154 over communications link 152. The node service management terminal 154 enables a user to make changes to the operation of the connected network node 100 and to load applications into the memory of the network node for processing by the network node 100.

Also connected to network node 100 though data exchange interface 160 is a representative subscriber device 164. The subscriber device 164 is connected through subscriber connection 162 and represents any number of connections that may be made from types of network nodes that provide services, such as network access, to end user. The data exchange interface 160 is, in turn, connected to the processor 110 of node 100 through data bus 119.

Network node 100 includes memory 120 that may be segmented into various memory segments. For example, memory 120 may include a memory segment into which an application performing packet analysis is performed (hereinafter "packet analysis memory segment 122"). Other programs available in memory 120 include a policy set 124 for handling data, a routing table and routing logic 126 for passing packets between network nodes, and various other applications 128 that may be needed for network node to perform its function in the network environment.

In one embodiment of the present invention, a node administrator may use the node service management terminal 154 to manually enter a set of criteria for data processing in network node 100. The manual criteria are processed by network node 100 and are incorporated into policy set 124 which determines how data will be processed. For example, the operator may enter a policy that data flows for all DSL connections are to be handled statelessly unless overridden by a higher order policy.

According to another aspect, the present invention may be configured on several levels. For example, data processing may be configured by the service provider and may also be configured by end-users or service subscribers. In this, complementary, embodiment of the present invention, an end-user of user device 164 may manually set the processing criteria for subscriber connection 162.

For example, the end-user may be given access privileges to set policy parameters for subscriber connection 164 by the node administrator. The end-user may then communicate over subscriber connection 162, through data interface 160 with the network node 100 and access the policy set 124 that applies to connection 162. The user may then manually make changes to the policy set indicating whether data traveling over the connection will be processed statefully or statelessly.

The subscriber need not explicitly state whether his/her traffic is to be handled statefully or statelessly; rather, by configuring policies that are to be applied to traffic originated from or destined to that subscriber, the system can automatically (i.e., implicitly) determine whether the subscriber's traffic needs to be handled statefully or statelessly.

In addition, from the policy configurations, the system can implicitly determine that only certain traffic flows from/to the subscriber should be handled statefully or statelessly. These determinations can be made base on, for example, packet source/destination address, the application issuing the traffic flow, or based on OSI Model Layer 7 information within the packets of certain application traffic flows.

According to the present invention, any given domain can have a combination of elements that require statefulness and other elements that run statelessly. Precisely the data processing that requires traversing the stateful elements will be handled in a stateful manner, and all other data processing will be handled completely statelessly.

Figure 2:
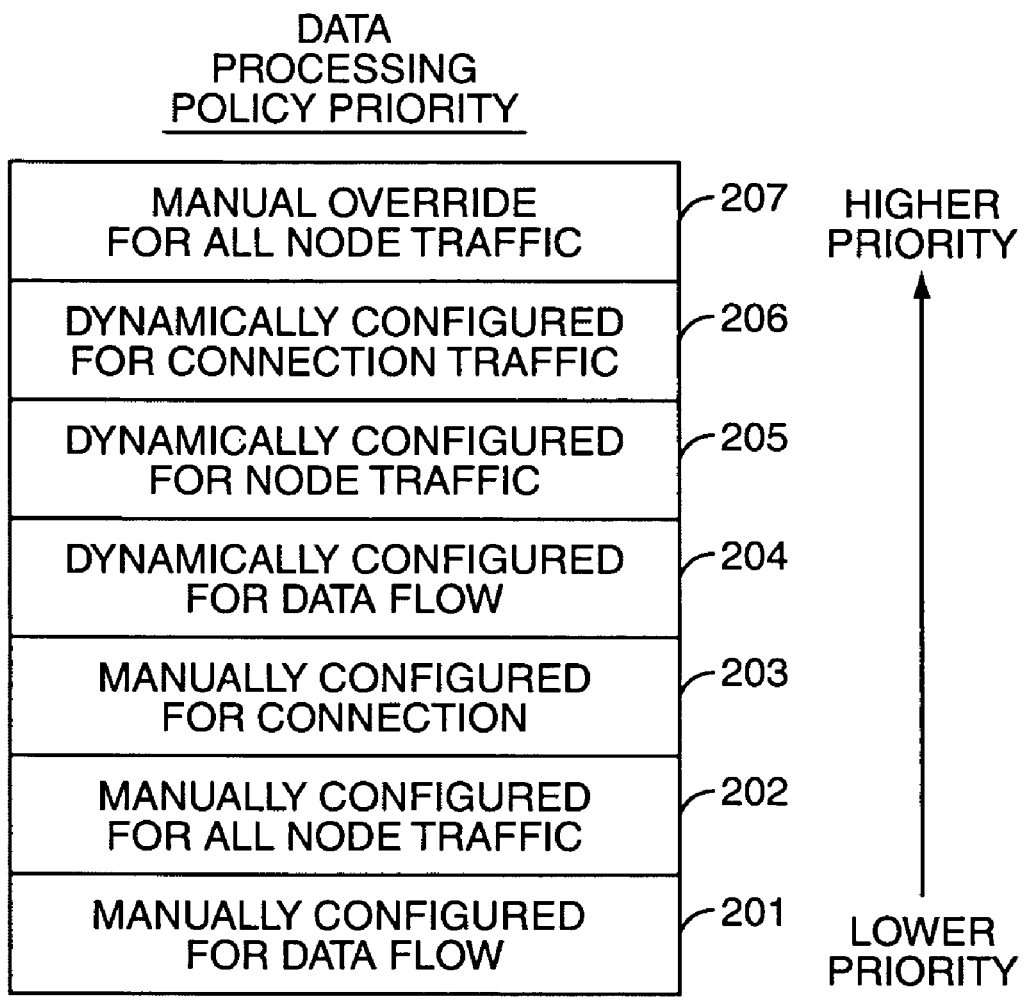
FIG. 2 is a table of data flow processing priority according to one embodiment of the present invention.

The order of priorities and discrepancies between policies may be reconciled by a table such as the example data processing priority table illustrated in FIG. 2. Referring to FIG. 2, the lowest priority policy may be, for example, a manual policy configured by the service provider for particular data flows 201. This policy would normally be overridden by higher lever policies, such as the higher priority policy shown for node traffic that is manually configured for by the service provider 202. These policy sets may then be overridden by manually configured policies set by a subscriber for that subscriber's connection 203.

In general, policies that are dynamically configured by the service provider for data flows 204 and node traffic 205 would be given a higher priority than the comparable manually configured policy sets. Likewise, dynamic policies for a particular connection 206 may also be set by the subscriber and would typically have a higher priority still. As also shown in FIG. 2, a manual override for all node traffic 207 would be desirable to allow the service provider to more closely control data processing under certain scenarios.

Such a hierarchy can be part of a larger hierarchical structure, where parents or children in a hierarchy tree could have additional priority policies for different types of traffic (e.g., different application flows), or based on the policy configuration for each interface, or both. In addition, the present invention also provides for different trees based on the current load of the system. For example, more stateful processing could be provided when there is sufficient memory remaining and sufficient processing power.

Figure 3:
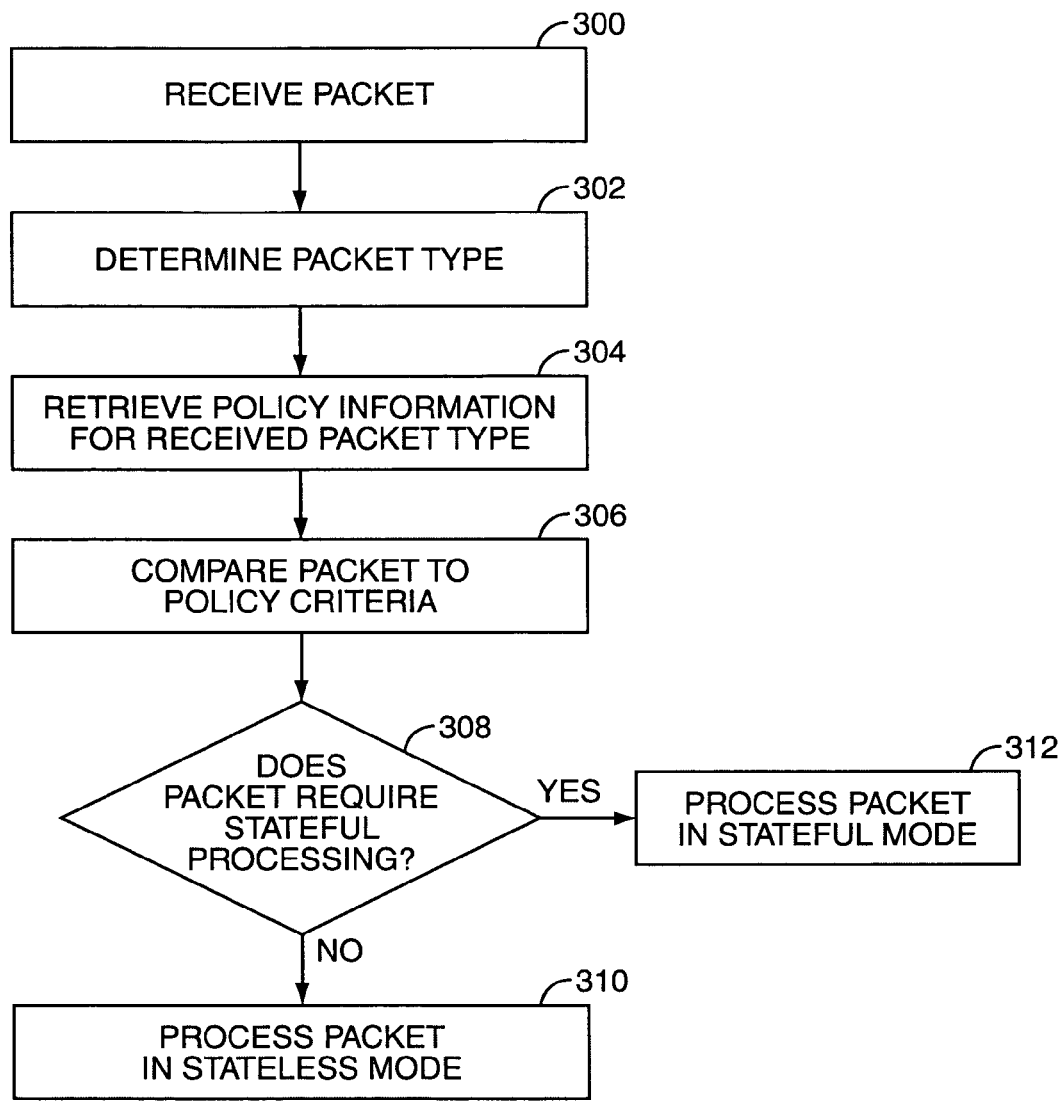
FIG. 3 is a flow chart illustrating an embodiment of the present invention.

FIG. 3 illustrates the operation of one embodiment of the present invention. According to FIG. 3 (Step 300), network node 100 receives a packet from, for example network node 106 via communication connection 106 and data exchange interface 130. The processor 110 of network node 100 calls upon the packet analysis program 122 to determine the packet type (Step 302). Once the packet type is determined, the policy set 124 is retrieved for the specific packet processing (Step 304). The packet analysis program 120 then compares the packet to the policy criteria (Step 306) and determines whether the packet requires stateful or stateless processing (Step 308). The packet is then processed in either stateless mode (Step 310) or in stateful mode (Step 312).

According to another, preferred, embodiment of the present invention, data processing may be changed between stateful and stateless processing in a dynamic manner. According to this embodiment, the packet analysis program may be programmed with a number of different stimuli that can cause dynamic changes for whether a domain or group of domains are to operate statefully or statelessly.

For example, one stimulus that may be programmed into the packet analysis is that certain program require stateful processing and that other programs do not require stateful processing. According to this embodiment, the packet analysis program may examine the application layer information of a packet, or a sampling of packets, and determine the type of program that the packet belongs to.

Figure 4:
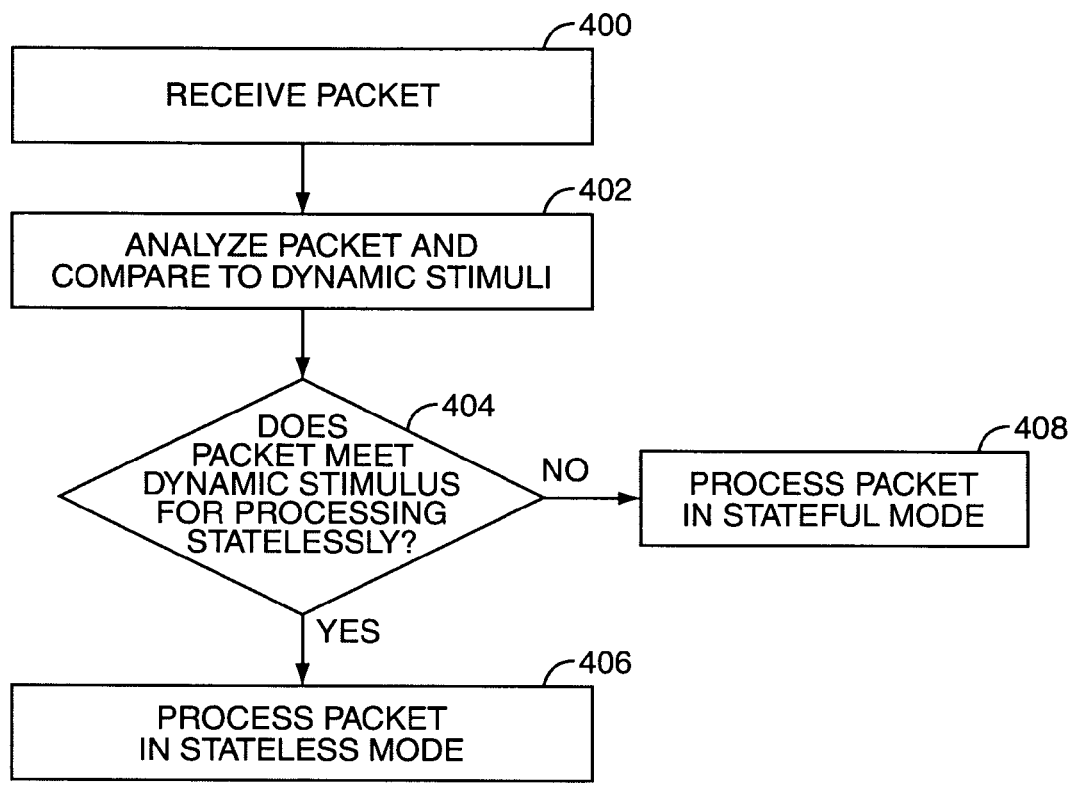
FIG. 4 is a flow chart illustrating an embodiment of the present invention.

FIG. 4, for example, illustrates the operation of a preferred embodiment of the present invention. According to FIG. 4, network node 100 receives a packet from, for example network node 106 via communication connection 106 and data exchange interface 130 (Step 400). Using, for example, the packet analysis program 122, the processor 110 of network node 100 analyzes the packet (Step 402). Considering both the packet characteristics and the dynamic criteria for stateless processing, the packet analysis program 122 determines whether the packet meets the dynamic criteria and determines whether the packet requires stateful or stateless processing (Step 404). The packet is then processed in either stateless mode (Step 406) or in stateful mode (Step 408).

Other stimuli may be network or processing resource dependent. For example, a processing node may process all data in a stateful mode until certain processor, memory, or data flow criteria is met, then change to processing acceptable data in a stateless manner until the resource usage fall below a determined level. There can be many such watermarks that slowly change the processing of a set of flows. For example, Firewall, NAT, transparent application load-balancing, QoS, accounting, may require differing levels of statefulness depending on the application flow and the policy configurations. The present invention by analyzing the data will determine at what levels stateful processing must be provided and, depending on other configurations, permit stateless processing of those levels that do not have these requirements.

Another stimulus for dynamic processing may occur when an element of a domain dynamically registers itself at run-time as being either stateful or stateless. The registration may be based on any stimuli such as including its current state, the time of day, day of year, etc., or any other external stimuli. Such an element can register itself as stateless or stateful for any or all domains using an instantiation of that element.

An embodiment of the present invention may be implemented in Nortel Networks™ Shasta™ Services Edge Router (SER). The SER is an IP services switch that, among other things, provides IP services in the form of wireless, cable, DSL, and wholesale dialing, to network subscribers. The embodiment of the present invention deployed in the SER is referred to as the Express Services Architecture (the "ESA"). The ESA provides an optimized forwarding path and mechanism for traffic that does not require stateful inspection and therefore reduces the use of "flowcache" resources. A "flowcache," among other things, provides a memory resource allocated on each service switching point (SSP) that provides memory for network nodes to store IP flow states.

Typically, in processing a data flow, when the first packet is passed through a service rule-set, the node will assign a single action, multiple actions, or sometimes no actions to the packet. Because the time and processing power typically required to pass every packet through a number of service rule sets is prohibitive, processing can be sped up by using a flowcache. In a flowcache, the first packet in a flow is passed through the entire subscriber rule set. After that the action list for that flow's packets is stored in a flow cache entry. Subsequent packets are compared against the flowcache. If there is a matching entry the action list is taken and the packet can thus be processed without reference to the full subscriber rule-set. In addition, flowcache associates static control channels and their dynamically negotiated data channels as a single application session through all stateful services. This is necessary to handle multi-channel applications such as File Transfer Protocol (FTP), Session Initiation Protocol (SIP), ITU-T H.323, etc, and works in concert with application layer gateways. Unfortunately, nodes that host large numbers of traffic flows have the potential to of significantly degraded service due to the demands of processing the data flows in this stateful manner.

However, according to the present invention, packets entering the SER go through packet classification where the system either matches the packet with an existing flowcache entry, or allocates new flowcache resource for it if no match is found. In implementing the present invention, the SER will not carry out packet classification as soon as a packet enters the SER. Instead, it will perform packet classification right before the packet enters a domain that has a stateful service installed. In other words, the SER allocates flowcache resource only if the traffic will go through stateful service, thus determining whether the traffic should be processing statefully or statelessly.

In implementing the ESA, specific services have been identified that will not require flowcache and may be run in a stateless mode. These services include: New ACL Security Service; Ingress and Egress Anti-Spoofing services; Limited configurations of ingress/egress diffserv marker services; AF traffic shaper service (egress); AF policer service (ingress); Bucket-based accounting service; Flow management service; FIB-lookup service. State aware services that may be applied to subscriber in ESA mode may be ones such as flow mirroring, traffic shaping (flow based), stateful security policy, NAT, or others. If necessary, a subscriber will be able to start functioning in full stateful manner with no disruption to service.

Although the present invention may be implemented on many different domain levels, there may be instances where the invention performs optimally at certain domains, but not at others. For example, in a preferred embodiment, the present invention is used in connection with providing specific services that in an optimal manner on a per packet basis (as opposed to on a flow basis). Such services include: Security services that function as optimized packet filters (non-state aware); Ingress and Egress Anti-Spoofing services; Assured Forwarding (AF) ingress and egress differentiated service (DS) marker service; AF traffic shaper service; AF traffic policing service.

According to an embodiment of the invention that may be implemented in accordance with the ESA, the subscriber's policy set is determined by his service set and his service provider's ESA state. For example, subscribers with no services or only stateless services, and whose service provider's ESA is enabled is automatically ESA enabled, otherwise it is disabled. The service provider may then be able to select the execution path of individual subscribers according to subscriber's services requirements.

According to one embodiment, subscribers who use only stateless services, and whose service provider's are ESA enabled, are automatically configured as ESA enabled. In this manner, ESA enabled subscribers typically will not consume flowcache resources. Thus, these subscribers who have no stateful services will not incur the packet classification overhead.

In another embodiment, the ESA state may be controlled by a license code. In a preferred embodiment of the invention that may be implemented as part of the ESA, service providers and subscribers are only allowed to use ESA specific services by default and are locked out of stateful and VPN services. This will force the operating system to exclude activation of any stateful services (e.g., flowcache usage) until activated by a license key. In one embodiment, the license keys may be input via a service control system or via the operating system at boot-up. It may be desirable in some embodiments to provide a unique license code to individual network nodes (e.g., to each given SER).

In another embodiment, the key can be generated using a unique identifier for a given SER such as the chassis MAC address base via key generation software. The license will be required to be input under the ESA configuration to explicitly enable stateful functionality (and there by disable exclusive ESA functionality) and VPN membership on that particular device. In a preferred embodiment, license codes should thereafter be stored as part of persistent configuration on the device.

It is to be understood that the present invention illustrated herein may be implemented by those of ordinary skill in the art as a computer program product having a medium with a computer program embodied thereon. The computer program product is capable of being loaded and executed on the appropriate computer processing device(s) in order to carry out the method or process steps described. Appropriate computer program code in combination with hardware implements many of the elements of the present invention. This computer code is often stored on storage media. This media can be a diskette, hard disk, CD-ROM, optical storage media, tape, or any similar media. The media can also be a memory storage device or collection of memory storage devices such as read-only memory (ROM) or random access memory (RAM). Additionally, the computer program code can be transferred to the appropriate hardware over a data network.

The present invention has been described, in part, with reference to flowchart illustration(s) or message diagram(s). It will be understood that each block of the flowchart illustration(s) or message diagram(s), and combinations of blocks in the flowchart illustration(s) or message diagram(s), can be implemented by computer program instructions.

These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block(s) or message diagram(s). These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block(s). The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block(s) or message diagram(s).

Accordingly, block(s) of flowchart illustration(s) or message diagram(s) support combinations of means for performing the specified functions, combinations of steps for performing the specified functions and program instruction means for performing the specified functions. It will also be understood that each block of flowchart illustration(s) or message diagram(s), and combinations of blocks in flowchart illustration(s), or message diagram(s) can be implemented by special purpose hardware-based computer systems that perform the specified functions or steps, or combinations of special purpose hardware and computer instructions.

Those skilled in the art will also recognize improvements and modifications to the preferred embodiments of the present invention. All such improvements and modifications are considered within the scope of the concepts disclosed herein and the claims that follow.

What is claimed is:

1. A method of processing data in a data network node, comprising;
   a) receiving a data packet which includes state information;
   b) analyzing the data packet;
   c) determining whether the data packet requires stateful processing; and
   d) if the data packet requires stateful processing, maintaining the state information, and if the data packet does not require stateful processing, discarding the state information,
   wherein the determining step further comprises comparing a packet characteristic of the data packet to a processing policy set; and
   wherein the processing policy set comprises a list of packet characteristics requiring stateful processing and a list of connection types requiring stateful processing; and
   wherein the processing policy set is dynamically determined by network conditions.

2. The method of claim 1, wherein the analyzing step further comprises:
   a) reading information contained in the data packet; and
   b) assigning at least one packet characteristic to the data packet based on the information contained in the data packet.

3. The method of claim 1, wherein the analyzing step further comprises reading packet header information contained in the data packet.

4. The method of claim 1, wherein the analyzing step further comprises reading payload information contained in the data packet.

5. The method of claim 4, wherein the analyzing step further comprises determining a program type with which the data packet is associated based on the payload information.

6. The method of claim 5, wherein the analyzing step further comprises assigning at least one packet characteristic based on the program type with which the data packet is associated.

7. The method of claim 1, wherein stateful processing comprises maintaining historical information about the data packet.

8. A method of processing data in a data network node, comprising:
   a) receiving a data packet which includes state information;
   b) analyzing the data packet;
   c) determining whether the data packet requires stateful processing; and
   d) if the data packet requires stateful processing, maintaining the state information, and if the data packet does not require stateful processing, discarding the state information,
   wherein the determining step further comprises comparing a packet characteristic of the data packet to a processing policy set; and
   wherein the processing policy set comprises a list of packet characteristics requiring stateful processing and a list of connection types requiring stateful processing; and
   wherein the processing policy set is dynamically determined by a time schedule.

9. The method of claim 8, wherein the analyzing step further comprises:
   a) reading information contained in the data packet; and
   b) assigning at least one packet characteristic to the data packet based on the information contained in the data packet.

10. The method of claim 8, wherein the analyzing step further comprises reading packet header information contained in the data packet.

11. The method of claim 8, wherein the analyzing step further comprises reading payload information contained in the data packet.

12. The method of claim 11, wherein the analyzing step further comprises determining a program type with which the data packet is associated based on the payload information.

13. The method of claim 12, wherein the analyzing step further comprises assigning at least one packet characteristic based on the program type with which the data packet is associated.

14. A system for processing data in a data network node, comprising:
   a) an interface disposed to communicate with a packet network;
   b) a control system, associated with the interface, configured to:
      i) receive a data packet which includes state information;
      ii) analyze the data packet;
      iii) determine whether the data packet requires stateful processing; and
      iv) if the data packet requires stateful processing, maintaining the state information, and if the data packet does not require stateful processing, discarding the state information;
   wherein the control system is further configured to compare a packet characteristic of the data packet to a processing policy set; and
   wherein the processing policy set comprises a list of packet characteristics requiring stateful processing and a list of connection types requiring stateful processing; and
   wherein the processing policy set is dynamically determined by network conditions.

15. The system of claim 14, wherein the control system is further configured to read information contained in the data packet and assign at least one packet characteristic to the data packet based on the information contained in the data packet.

16. The system of claim 14, wherein the control system is further configured to analyze the data packet by reading packet header information contained in the data packet.

17. The system of claim 14, wherein the control system is further configured to analyze the data packet by reading payload information contained in the data packet.

18. The system of claim 17, wherein the control system is further configured to analyze the data packet by determining a program type with which the data packet is associated based on the payload information.

19. The system of claim 18, wherein the analyzing step further comprises assigning at least one packet characteristic based on the program type with which the data packet is associated.

20. The system of claim 14, wherein stateful processing comprises maintaining historical information about the data packet.

21. A system for processing data in a data network node, comprising:
   a) an interface disposed to communicate with a packet network;
   b) a control system, associated with the interface, configured to:
      i) receive a data packet which includes state information;
      ii) analyze the data packet;
      iii) determine whether the data packet requires stateful processing; and
      iv) if the data packet requires stateful processing, maintaining the state information, and if the data packet does not require stateful processing, discarding the state information;
   wherein the control system is further configured to compare a packet characteristic of the data packet to a processing policy set; and
   wherein the processing policy set comprises a list of packet characteristics requiring stateful processing and a list of connection types requiring stateful processing; and
   wherein the processing policy set is dynamically determined by a time schedule.

* * * * *